US011030705B1

(12) United States Patent
Pascual et al.

(10) Patent No.: US 11,030,705 B1
(45) Date of Patent: Jun. 8, 2021

(54) QUICK SERVE TAX APPLICATION

(71) Applicants: Glen C. Pascual, Mililani, HI (US); Antonio J. Hernandez, Chula Vista, CA (US); Brea Anne Hylan, Carson City, NV (US); Joanne Magracia, Lemon Grove, CA (US); Melissa Truong, San Diego, CA (US); Minh Hai Bach, San Diego, CA (US)

(72) Inventors: Glen C. Pascual, Mililani, HI (US); Antonio J. Hernandez, Chula Vista, CA (US); Brea Anne Hylan, Carson City, NV (US); Joanne Magracia, Lemon Grove, CA (US); Melissa Truong, San Diego, CA (US); Minh Hai Bach, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 424 days.

(21) Appl. No.: 15/908,331

(22) Filed: Feb. 28, 2018

(51) Int. Cl.
*G06Q 40/00* (2012.01)
*H04L 29/06* (2006.01)
*G06N 20/00* (2019.01)

(52) U.S. Cl.
CPC .......... *G06Q 40/123* (2013.12); *G06N 20/00* (2019.01); *H04L 63/08* (2013.01)

(58) Field of Classification Search
USPC ......................................................... 705/31
See application file for complete search history.

(56) References Cited

U.S. PATENT DOCUMENTS

| | | | | |
|---|---|---|---|---|
| 2002/0111888 A1* | 8/2002 | Stanley | .................. | G06Q 40/02 705/31 |
| 2006/0095521 A1* | 5/2006 | Patinkin | .................. | H04L 51/12 709/206 |
| 2011/0255782 A1* | 10/2011 | Welling | ............. | G06K 9/00442 382/173 |
| 2012/0084185 A1* | 4/2012 | Ciaramitaro | ......... | G06Q 40/123 705/31 |
| 2012/0166970 A1* | 6/2012 | Gastaldi | ................ | H04L 67/146 715/753 |
| 2013/0033522 A1* | 2/2013 | Calman | .................. | G06Q 30/06 345/633 |
| 2014/0244456 A1* | 8/2014 | Huang | ................. | G06Q 40/123 705/31 |

OTHER PUBLICATIONS

ABBYY, "ABBYY FlexiCapture Engine"; <https://web.archive.org/web/20170607072907/https://www.abbyy.com/en-us/data-capture-sdk> dated Jun. 7, 2017; Last Accessed May 23, 2018 (3 pages).

* cited by examiner

*Primary Examiner* — Ryan D Donlon
*Assistant Examiner* — Paul S Schwarzenberg
(74) *Attorney, Agent, or Firm* — Ferguson Braswell Fraser Kubasta PC (57) ABSTRACT

A method includes importing personal and financial information from an image of a third-party tax form associated with a taxpayer. The method further includes assigning, based at least in part on the personal and financial information, the taxpayer to one of a plurality of user classes. The user class of the taxpayer determines at least one subsequent interaction between the taxpayer and an online tax application. And the method includes using at least some of the personal and financial information to pre-populate one or more fields of an online tax return for the taxpayer. The online tax return is presented in a view in a graphical user interface displayed by the online tax application.

17 Claims, 8 Drawing Sheets

QUICK SERVE TAX APPLICATION

BACKGROUND

To save money on data plans and space in small residential quarters, many, people use a smartphone as their sole personal computing and communication device. When necessary, the smartphone is supplemented with a desktop computer or laptop at a library or place of employment.

Most employment agreements and public facility policies provide that the employee or patron has no privacy rights in personal documents created online on a work or public computer. So such computers are far from optimal for creating sensitive personal documents such as online tax returns or financial statements.

The screen and keyboard size of most smartphones do not lend themselves to the entry of the large amounts of text found on third-party tax forms, such as W2 forms. Consequently, filing even simple returns is an arduous task for smartphone users.

SUMMARY

In general, in one aspect, the invention relates to a method. The method includes importing personal and financial information from an image of a third-party tax form associated with a taxpayer. The method further includes assigning, based at least in part on the personal and financial information, the taxpayer to one of a plurality of user classes. The user class of the taxpayer determines at least one subsequent interaction between the taxpayer and an online tax application. And the method includes using at least some of the personal and financial information to pre-populate one or more fields of an online tax return for the taxpayer. The online tax return is presented in a view in a graphical user interface displayed by the online tax application.

In general, in one aspect, the invention relates to non-transitory computer-readable storage media configured to store a program, which when executed, imports personal and financial information from an image of a third-party tax form associated with a taxpayer. The program further assigns, based at least in part on the personal and financial information, the taxpayer to one of a plurality of user classes. The user class of the taxpayer determines at least one subsequent interaction between the taxpayer and an online tax application. And the program uses at least some of the personal and financial information to pre-populate one or more fields of an online tax return for the taxpayer. The online tax return is presented in a view in a graphical user interface displayed by the online tax application.

In general, in one aspect, the invention relates to a system. The system includes a processor and memory and instructions stored in the memory which, when executed by the processor, import personal and financial information from an image of a third-party tax form associated with a taxpayer. The instructions further assign, based at least in part on the personal and financial information, the taxpayer to one of a plurality of user classes. The user class of the taxpayer determines at least one subsequent interaction between the taxpayer and an online tax application. And the instructions use at least some of the personal and financial information to pre-populate one or more fields of an online tax return for the taxpayer. The online tax return is presented in a view in a graphical user interface displayed by the online tax application.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

Figure 1:
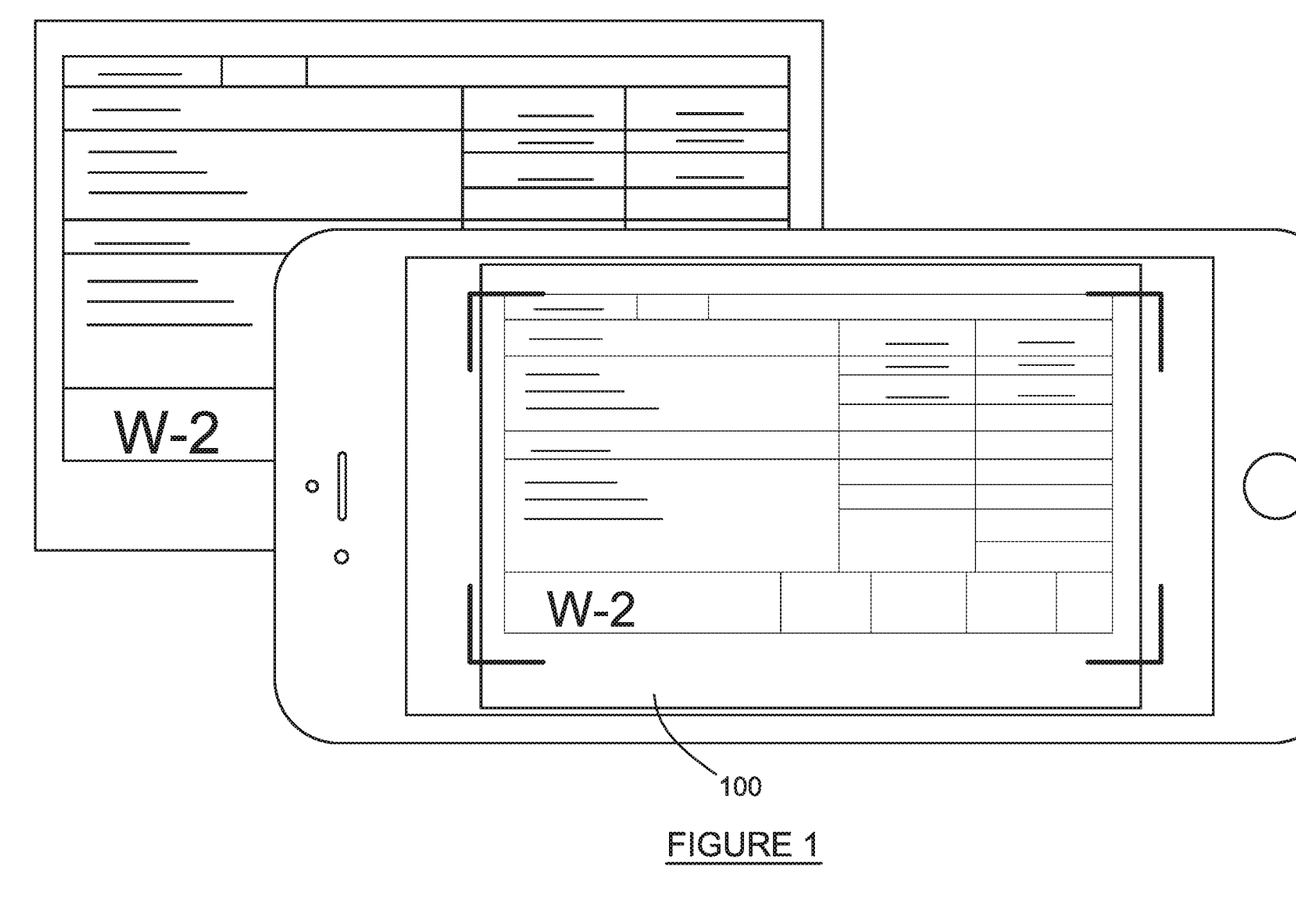
FIG. 1 depicts an image of a W2 form captured by a smartphone, in accordance with one or more embodiments.

In general, one or more embodiments of the invention help solve the problem of filing an online tax return from a smartphone. The software at an online tax service, e.g., an online tax application, obtains an image of a third-party tax form such as a W2 from a new user through an email message. FIG. 1 shows such image (100). The software residing on the smartphone, then imports the personal and financial information on the image using text recognition software (such as ABBYY FineReader) and sends the new user an email with temporary credentials (e.g., a temporary login name and password). Then the software assigns the new user to one of a group of user classes based on the personal and financial information. The user class determines the subsequent interaction, e.g., in graphical user interface (GUI) dialogs, between the new user and the online tax service. The software also uses the personal and financial information to pre-populate an online tax return. Then the software allows the new user to access the pre-populated online tax return upon presentation of the temporary credentials. If the user confirms the pre-populated tax return, the new user is able to file the tax return with a command in a GUI displayed by the online tax application on the smartphone.

Figure 2A:
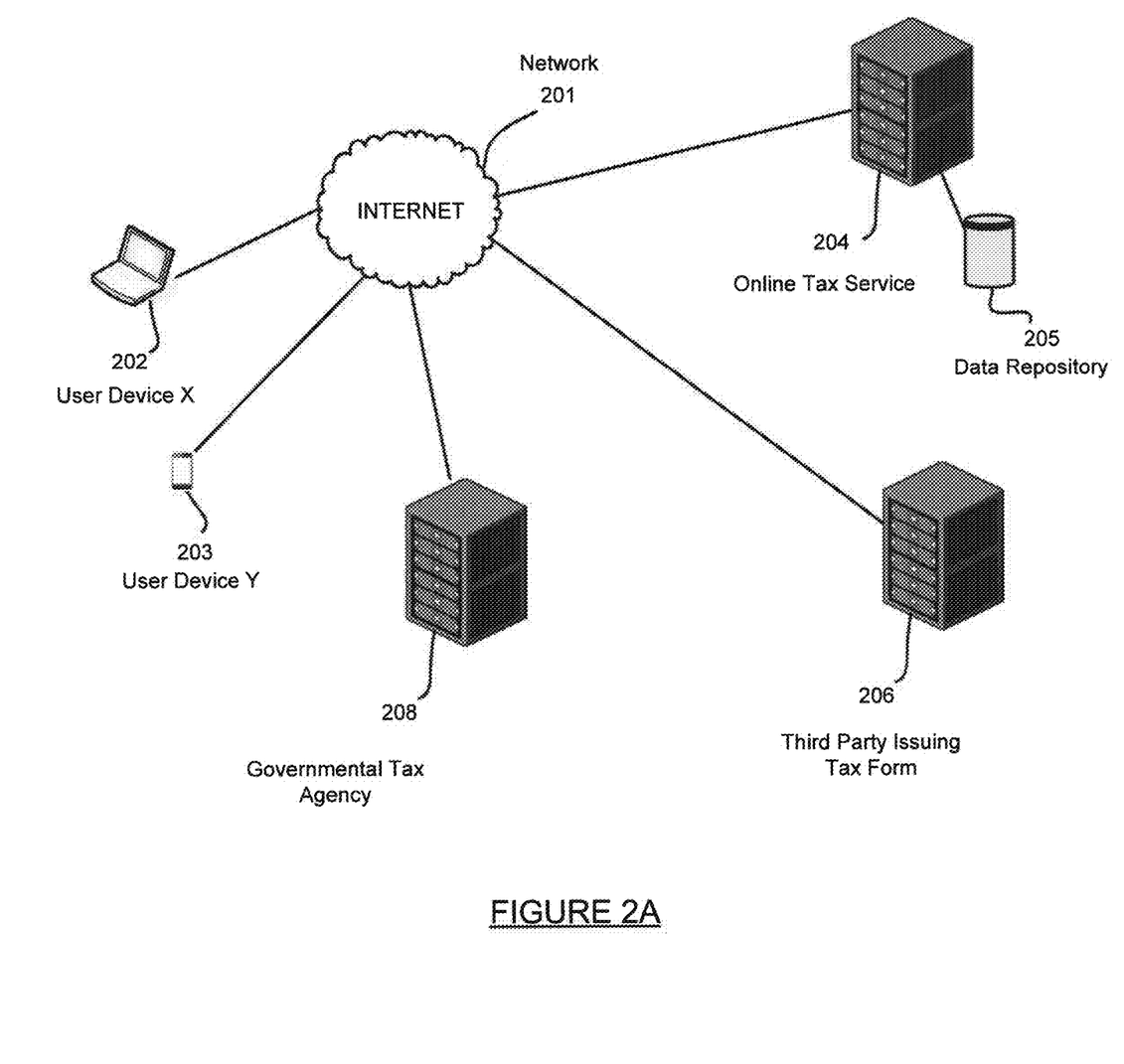
FIG. 2A depicts a network diagram showing a system for automating an online tax return, in accordance with one or more embodiments.

FIG. 2A depicts a network diagram showing a system for automating an online tax return, in accordance with one or more embodiments. As depicted in FIG. 2A, users might use user computing device X (202) (e.g., a laptop or other personal computer) and/or user computing device Y (203) (e.g., a mobile device such as a smartphone or a tablet computer) to access over network (201): (a) an online tax service (204) with computing resources (e.g., hardware servers) that host an online tax application, such as a massively multi-user online tax application (e.g., TurboTax Online™); (b) a third party issuing a tax form (206), such as a W2 form; and (c) a governmental tax authority (208). Network (201) is a wide area network (WAN) including the Internet, which is wireless in part or in whole. Also, online tax service (204) uses network (201) to access the third party issuing a tax form (206) and the governmental tax authority (208).

In one or more embodiments, computing device X (202) and the servers at online tax service (204) include: (1) hardware with one or more microprocessors (e.g., from the x86 family, the ARM family, or the PowerPC family), volatile storage (e.g., RAM), and persistent storage (e.g., flash memory, a hard disk, or a solid-state drive); and (2) an operating system (e.g., WINDOWS®, MACOS®, LINUX®, WINDOWS SERVER™, etc.) capable of running on the hardware.

In one or more embodiments, user computing device Y (203) is a smart phone and includes: (1) hardware with one or more microprocessors (e.g., from the ARM family or the x86 family), volatile storage (e.g., RAM), and persistent storage (e.g., flash memory such as microSD); (2) an operating system (e.g., iOS®, ANDROID™, WINDOWS MOBILE®, LINUX®, SYMBIAN OS®, etc.) that runs on the hardware; (3) one or more accelerometers, one or more gyroscopes, one or more magnetometers, one or more pedometers, and one or more barometers; (4) a global positioning system (GPS), a global navigation satellite system (e.g., GNSS), Visual-Inertial Odometry (VIO), or other location-identifying capability; and (5) a camera with an autofocus lens.

In one or more embodiments, online tax service (204) includes computing resources with a number of servers (e.g., racked servers) connected by a network (e.g., a local area network (LAN) or a WAN) to each other in a cluster (e.g., a load-balancing cluster, a HADOOP® cluster, a. Beowulf cluster, etc.) or other distributed system which might run online tax service software (e.g., an online tax application, web-server software, database software, etc.) and distributed-computing and/or cloud software such as Map-Reduce, Google File System, HADOOP®, HADOOP® File System, HADOOP® YARN, Hive, Dremel, CloudBase, Memcached, REDIS®, etc. The servers at online tax service (204) are connected to data repository (205). Data repository (205) might include flash memory, a redundant array of independent disks (RAID), and/or a storage area network (SAN), in one or more embodiments. Additionally or alternatively, online tax service (204) and/or data repository (205) might be hosted wholly or partially in a public and/or private cloud, e.g., where the cloud resources serve as a platform-as-a-service (PaaS) or an infrastructure-as-a-service (IaaS). In one or more embodiments, the online tax service (204) might use the machine learning and/or artificial intelligence (AI) services provided by Amazon Web Services (AWS), e.g., to assign a user to one of a group of user classes.

Returning to FIG. 2A, in one or more embodiments, user computing device X (202) and user computing device Y (203) each include a web browser as an application program (or app) or as part of an operating system. Examples of web browsers that might execute on user computing device X (202) include INTERNET EXPLORER®, MOZILLA FIREFOX®, SAFARI®, and GOGGLE CHROME™. Examples of web browsers that might execute on user computing device Y (203) include SAFARI®, MOZILLA FIREFOX®, and Android™. It will be appreciated that users of user computing device X (202) and/or user computing device Y (203) might use web browsers to access online tax service (204), the third party issuing a tax form (206), and/or the governmental tax authority (208). Additionally or alternatively, users of user computing device X (202) and/or user computing device Y (203) might use other application programs or apps to access online tax service (204), the third party issuing a tax form (206), and/or the governmental tax authority (208).

As used in this disclosure, a third-party tax form is a form associated with a taxpayer that is issued by a third-party, such as an employer, contractor, financial institution, etc. Such forms include W2 forms, 1099-MISC forms, 1009-INT forms, mortgage statements, etc. Also as used in this disclosure, personal data from a third-party tax form is data identifying a taxpayer. Financial data from a third-party tax form is tax accounting data. By way of example, personal data on a W2 form includes the user's name, address, and social security number. Financial data on a W2 form includes the wages paid and taxes withheld.

Figure 2B:
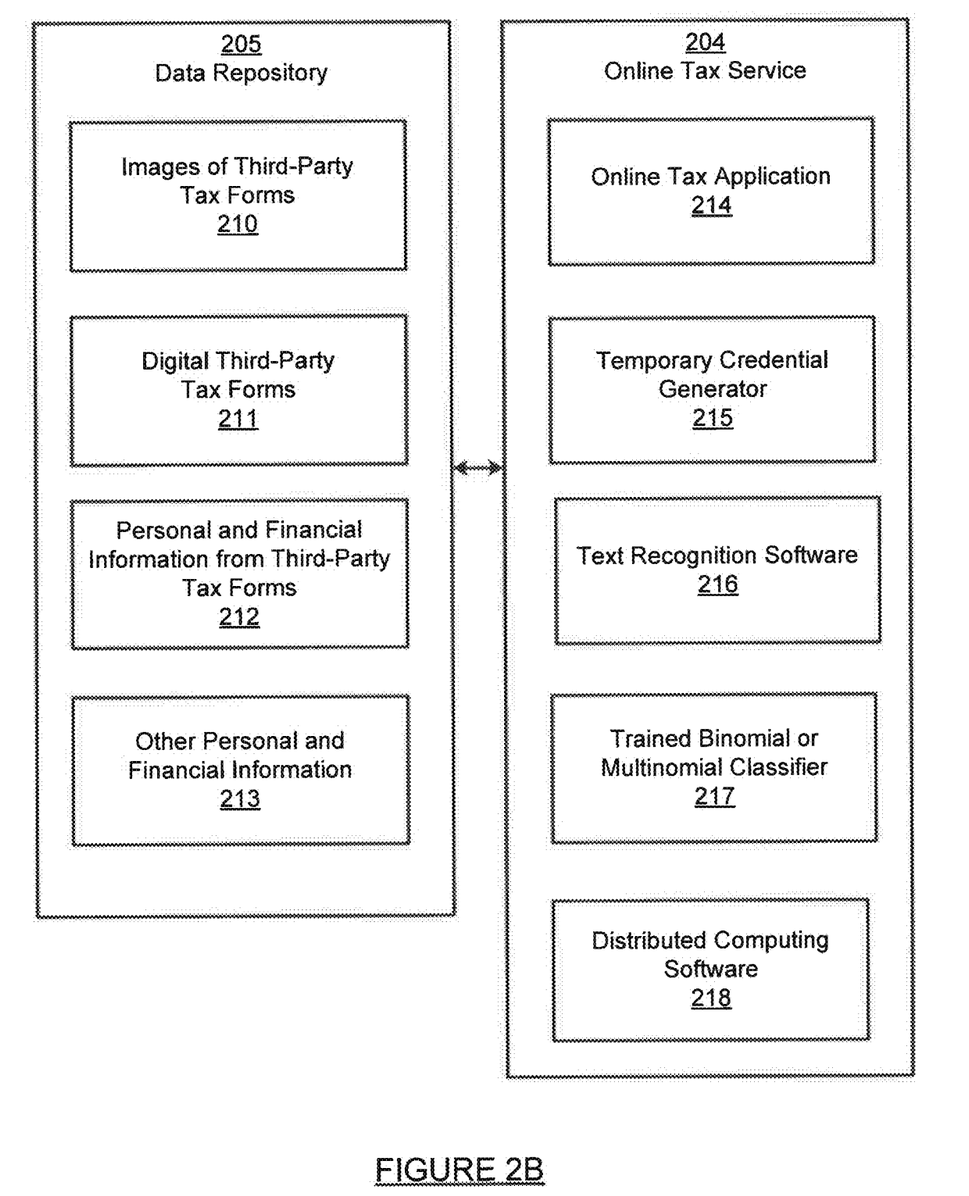
FIG. 2B depicts components used for automating an online tax return, in accordance with one or more embodiments.

FIG. 2B depicts components used for automating an online tax return, in accordance with one or more embodiments. In one or more embodiments, data repository (205) stores algorithms and data related to the processes described in this disclosure. More specifically, data repository (205) stores images of third-party tax forms (210), e.g., as captured with a smartphone camera. Data repository (205) also stores digital third-party tax forms (211), e.g., obtained from an employer using secured delegated access such as OAuth or an application programming interface (API) that supports an open financial exchange (OFX) format. Data repository (205) also stores personal and financial information from third-party tax forms (212), e.g., obtained from a smartphone's preview screen using real-time recognition functionality. And data depository (205) also stores other personal and financial information, e.g., as obtained from an image of a driver's license or a paycheck.

As described in greater detail below, the personal and financial information is used by online tax application (214) to pre-populate an online tax return. Additionally, the personal and financial information is used by trained binomial or multinomial classifier (216) to assign the taxpayer to one of a group of user classes, for purposes of subsequent interaction with the online tax service. The online tax application (214) and the trained binomial or multinomial classifier (217) run on the server computing devices for the online tax services (204), along with the temporary credential generator (215), text recognition software (216), and distributed computing software (218), which might include HADOOP®, HADOOP® YARN, etc. As implied by its name, temporary credential generator (215) generates credentials (e.g., a login name and a password) that expire in a short period time such as one day. In one or more embodiments, the temporary, credentials might be randomly generated. Alternatively, the temporary credentials might be generated using a profile that specifies a prefix for all usernames and a specific password.

Figure 3:
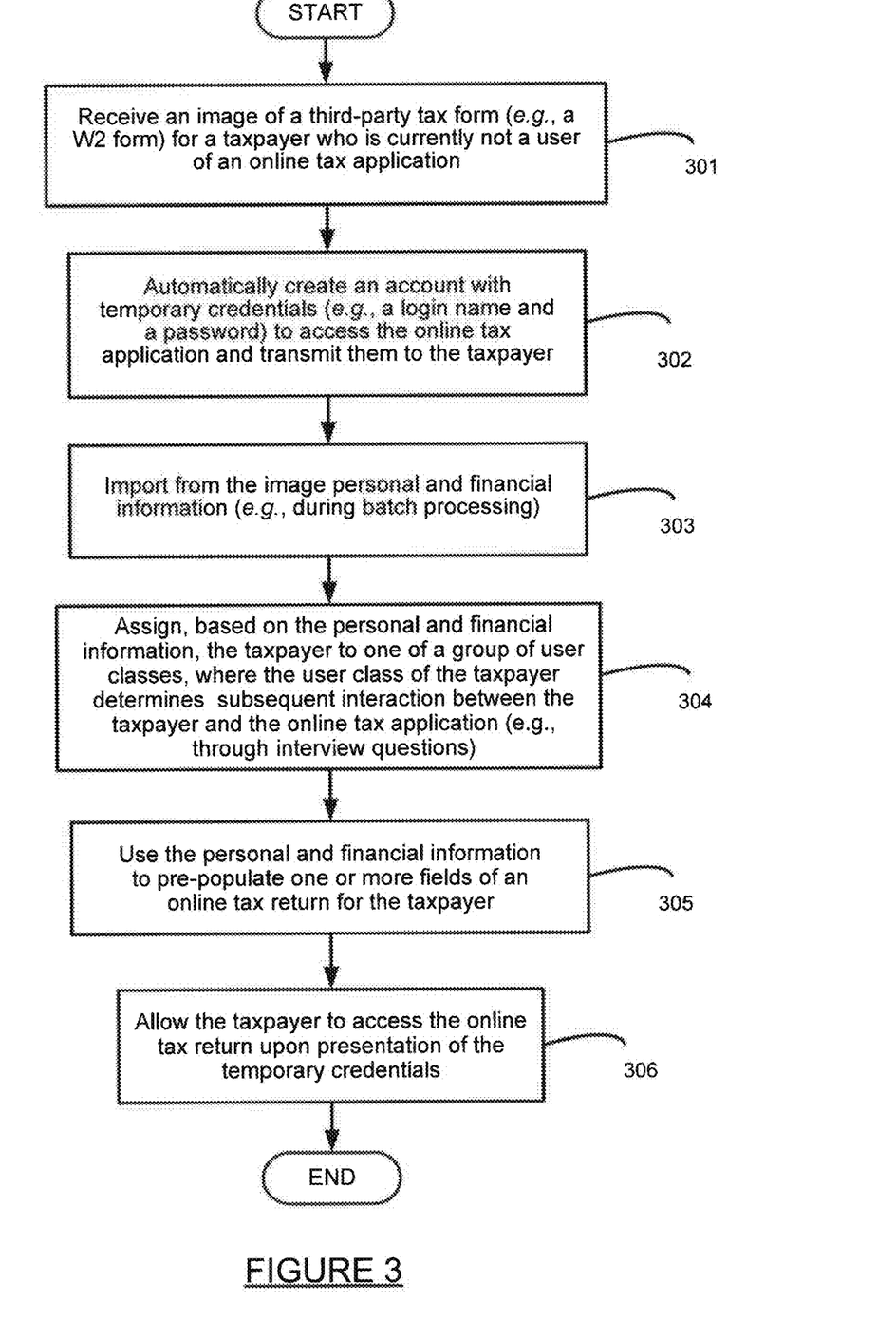
FIG. 3 depicts a flowchart diagram of a process for automating an online tax return for a new user, in accordance with one or more embodiments.

FIG. 3 depicts a flowchart diagram of a process for automating an online tax return for a new user, in accordance with one or more embodiments. In one or more embodiments, the operations shown in this figure and in the other flowcharts described below might be performed by software running on servers at an online tax service using a data repository. In one or more embodiments, one or more of the operations shown in FIG. 3 and in the other flowcharts described below might be performed on clustered computers running distributed-computing software that supports batch processing based on a Map-Reduce architecture (e.g., HADOOP®).

In one or more embodiments, one or more of the operations shown in FIG. 3 and in the other flowcharts described below might be performed on clustered computers running distributed-computing software that supports stream processing based on a Map-Reduce architecture (e.g., HADOOP® YARN architecture). In one or more embodiments, all or some of the operations shown in FIG. 3 and in the other flowcharts described below might be performed by software (e.g., a client application including, for example, a webpage with embedded JAVASCRIPT® scripting language program code or ACTIONSCRIPT® scripting language program code) running on a client device, e.g., user computing device X or user computing device Y.

While the various operations in this flowchart and the flowcharts below are presented and described sequentially, one of ordinary skill will appreciate that some or all of the operations may be executed in different orders, may be combined or omitted, and some or all of the operations may be executed in parallel. Furthermore, the operations may be performed actively or passively. For example, some operations may be performed using polling or be interrupt-driven, in accordance with one or more embodiments of the invention. By way of an example, determination operations may not require a processor to process an instruction unless an interrupt is received to signify that a condition exists, in accordance with one or more embodiments of the invention. As another example, determination operations may be performed by performing a test, such as checking a data value to test whether the value is consistent with the tested condition, in accordance with one or more embodiments of the invention.

As depicted in FIG. 3, software, e.g., an online tax application running on servers at an online tax service, receives an image of a third-party tax form (e.g., a W2 form) for a taxpayer who is currently not a user of the online tax application, in operation 301. The image might have been captured with a camera in a mobile phone and transmitted to the online tax application, e.g., via an email and/or text message. In operation 302, the software automatically creates an account with temporary credentials (e.g., a login name and a password) to access the online tax application and transmits them to the taxpayer, e.g., via an email and/or text message. In operation 303, the software imports from the image personal and financial information (e.g., during batch processing of a group of images), using text recognition software such as ABBYY FineReader. In operation 304, the software assigns, based on the personal and financial information, the taxpayer to one of a group of user classes, where the user class of the taxpayer determines subsequent interaction between the taxpayer and the online tax service, e.g., through interview questions presented (a) in views such as dialog boxes displayed in a graphical user interface (GUI) and/or (b) a conversational interface that mimics chatting with a real human. In one or more embodiments, the assignment to a user class might be might be performed using a trained binomial or trained multinomial classifier from the sci-kit learn library for supervised machine learning. It will be appreciated that such a classifier might use, e.g., logistic regression, random forests, support vector machines, naïve Bayes, stochastic gradient descent, etc. It will also be appreciated that such a classifier might be trained using historical personal and financial data of other users. Examples of a conversational interface include Apple Siri, OK Google, Amazon Echo, and Microsoft Cortana. In operation 305, the software uses the personal and financial information to pre-populate one or more fields of an online tax return for the taxpayer. Then in operation 306, the software notifies the taxpayer that the third-party tax form has been imported into an online tax return by the online tax service.

Figure 4A:
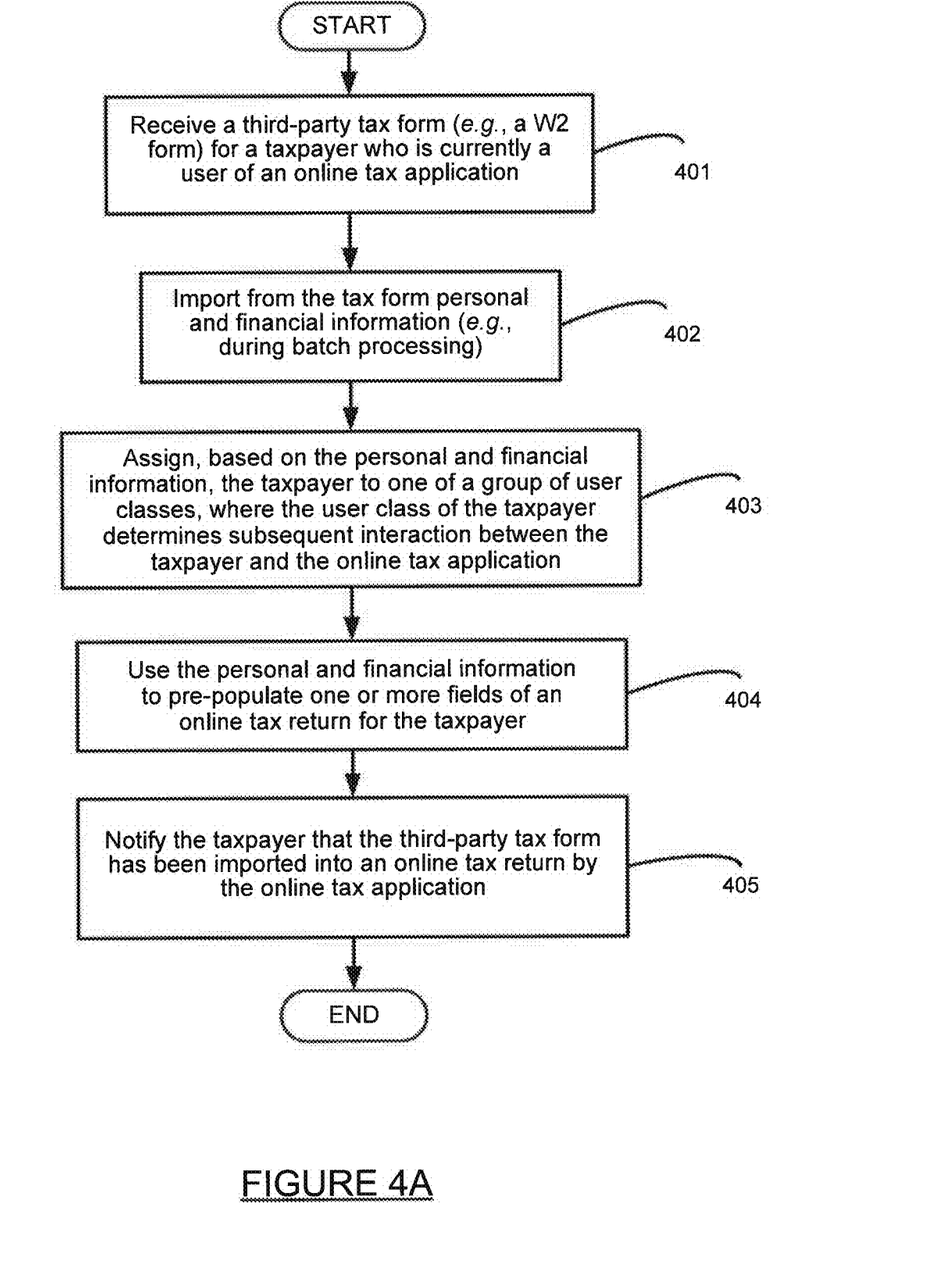
FIG. 4A depicts a flowchart diagram of a process for automating an online tax return for an existing user, in accordance with one or more embodiments.

FIG. 4A depicts a flowchart diagram of a process for automating an online tax return for an existing user, in accordance with one or more embodiments. As shown in FIG. 4A, software, e.g., an online tax application running on servers at an online tax service, receives a third-party tax form (e.g., a W2 form) for a taxpayer who is currently a user of an online tax service, in operation 401. The tax form might have been transmitted by an employer of the taxpayer, e.g., using secured delegated access such as OAuth or an application programming interface (API) that supports an open financial exchange (OFX) format. In operation 402, the software imports from the tax form personal and financial information (e.g., during batch processing of a group of images) using text recognition software such as ABBYY FineReader. In operation 403, the software assigns, based on the personal and financial information, the taxpayer to one of a group of user classes, where the user class of the taxpayer determines subsequent interaction between the taxpayer and the online tax service, e.g., through interview questions presented (a) in views such as dialog boxes displayed in a GUI and/or (b) a conversational interface that mimics chatting with a real human. Here again, in one or more embodiments, the assignment to a user class might be might be performed using a trained binomial or trained multinomial classifier from the sci-kit learn library for supervised machine learning. It will be appreciated that such a classifier might use, e.g., logistic regression, random forests, support vector machines, naïve Bayes, stochastic gradient descent, etc. It will also be appreciated that such a classifier might be trained using historical personal and financial data of other users. In operation 404, the software uses the personal and financial information to pre-populate one or more fields of an online tax return for the taxpayer. Then in operation 405, the software allows the taxpayer to access the online tax return upon presentation of the temporary credentials.

Figure 4B:
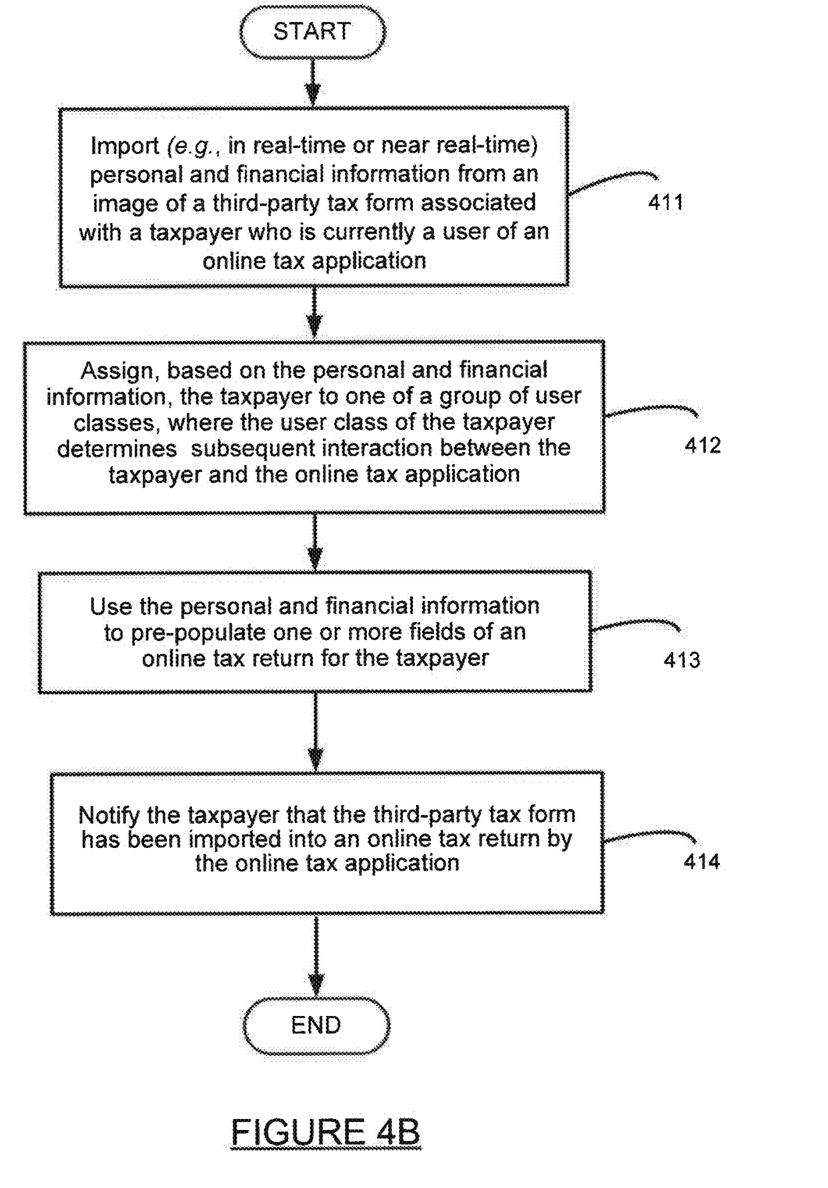
FIG. 4B depicts a flowchart diagram of a process for automating an online tax return for an existing user using real-time recognition, in accordance with one or more embodiments.

FIG. 4B depicts a flowchart diagram of a process for automating an online tax return for an existing user using real-time recognition, in accordance with one or more embodiments. As shown in FIG. 4B, software, e.g., running on a mobile device such as a smartphone, imports (e.g., in real-time or near real-time) personal and financial information from an image of a third-party tax form associated with a taxpayer who is currently a user of an online tax application, in operation 411. In operation 412, the software assigns, based on the personal and financial information, the taxpayer to one of a group of user classes, where the user class of the taxpayer determines subsequent interaction between the taxpayer and the online tax service, e.g., through interview questions presented (a) in views such as dialog boxes displayed in a GUI and/or (b) a conversational interface that mimics chatting with a real human. Once more, in one or more embodiments, the assignment to a user class might be might be performed using a binomial or multinomial classifier from the sci-kit learn library for supervised machine learning. It will be appreciated that such a classifier might use, e.g., logistic regression, random forests, support vector machines, naïve Bayes, stochastic gradient descent, etc. It will also be appreciated that such a classifier might be trained using historical personal and financial data of other users. In operation 413, the software uses the personal and financial information to pre-populate one or more fields of an online tax return for the taxpayer. Then in operation 414, the software notifies the taxpayer that the third-party tax form has been imported into an online tax return by the online tax service.

Figure 4C:
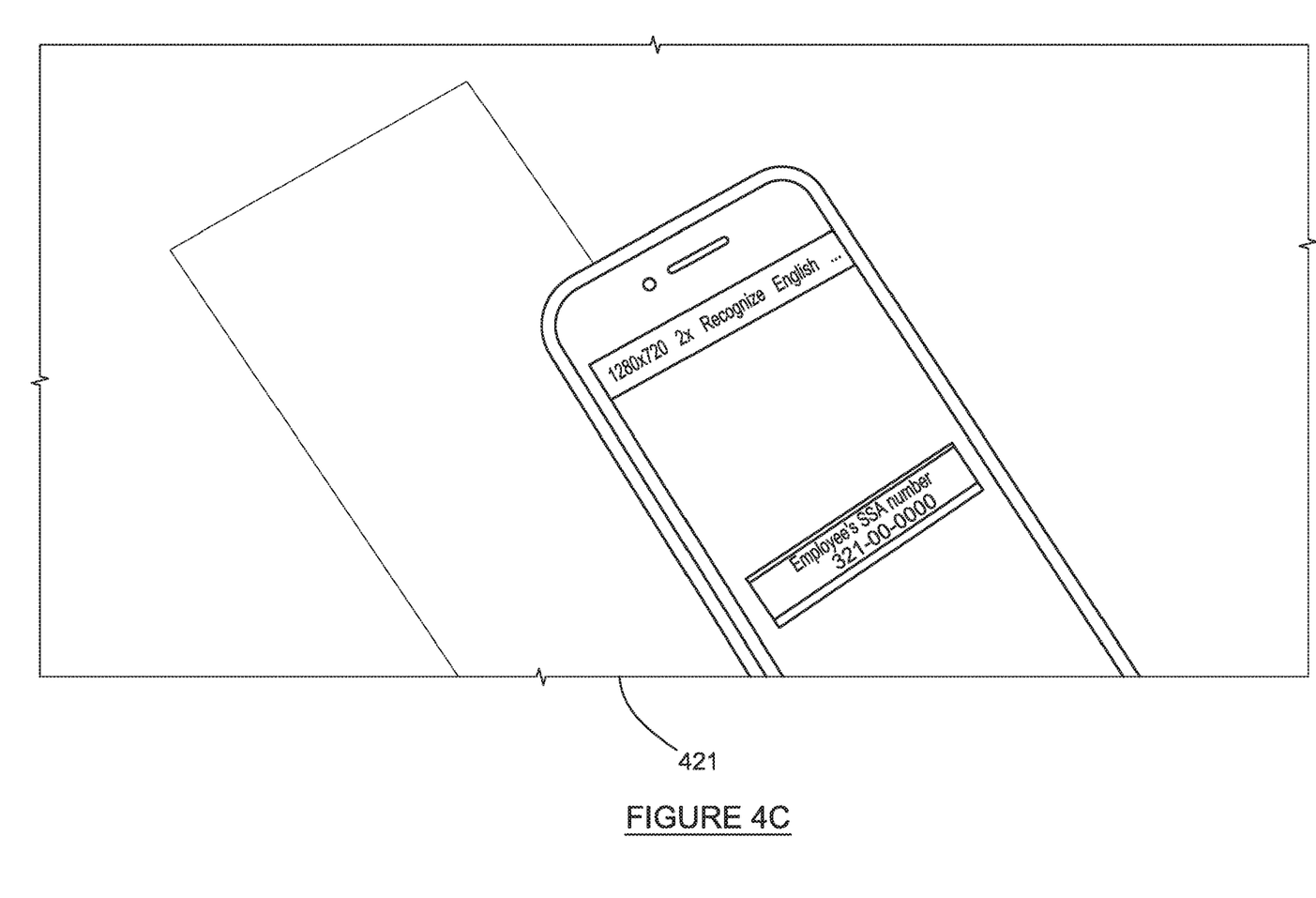
FIG. 4C shows real-time recognition functionality, in accordance with one or more embodiments.

FIG. 4C shows real-time recognition functionality, in accordance with one or more embodiments. In those embodiments, such functionality might be used in operation 411 in FIG. 4. In one or more embodiments, real-time recognition functionality (421) extracts text directly from the preview screen of a smartphone, rather than capturing an image of the text and processing the image with optical character recognition (OCR). It will be appreciated that the latter two operations are slower than extracting text directly from the preview screen. An example of real-time recognition functionality is the functionality provided by the ABBYY Real-Time Recognition SDK.

The following use cases are for explanatory purposes only and no n ended to limit the scope of the invention.

The first use case involves a new user of an online tax application. The new user snaps a photo of a W2 form provided by her employer with his/her smartphone camera and emails the photo to the online tax application. In response, the online tax application emails the user temporary credentials (e.g., a login name and a password that last 24 hours) along with a communication that includes language similar to the following: "Thanks, Jane. We are processing your information on our secure system and will email you at janeuser@hotmail.com for further instructions. Please contact us at info@Turbotax.com, if you have any questions or concerns about your account." The online tax application OCRs and imports the personal and financial information included in the W2 form, using batch processing with other images at the end of the day. On the basis of the personal and financial information, the online tax application assigns the user to one of a group of user classes. The assigned user class determines which interview questions are subsequently presented in dialog boxes to the user. For example, the user might be assigned, by a trained binomial or trained multinomial classifier to a class of users that is likely to itemize deductions based on the user's personal and financial information, e.g., the user lives in New York and has paid state and local taxes exceeding $9000.00. Then the online tax application uses the personal and financial information to pre-populate an online tax return. The online tax application sends the user another email, notifying her that her pre-populated tax return is available for review on a particular webpage whose link is provided. If the user accesses the webpage using the temporary credentials, the user is allowed to change or confirm the pre-populated tax return. Alternatively, the user might be required to create permanent credentials before changing or confirming the pre-populated tax return. Once changed or confirmed, the user can file the online tax return with a governmental tax agency, e.g., using a GUI command from the user's smartphone.

The second use case involves an existing user of an online tax application. Using an authorization provided by the user, the online tax application obtains a copy of a W2 form for the user from an employer of the user, e.g., through an Open Financial Exchange (OFX) interface. The online tax application emails a communication that includes language similar to the following: ""Hi John. We have the following W2 on file for you: 2017 W2 from BestBuy. With your permission, we can automate the import of this W2 to get you ready for tax season. Please click here if you want us to automate this for you." If the user clicks the link, the online tax application OCRs and imports the personal and financial information included in the W2 form. On the basis of the personal and financial information, the online tax application assigns the user to one of a group of user classes. The assigned user class determines which interview questions are subsequently presented in dialog boxes to the user. Then the online tax application uses the personal and financial information to pre-populate an online tax return. The online tax application sends the user another email, notifying him that his pre-populated tax return is available for review on a particular webpage whose link is provided. If the user accesses the webpage using his existing credentials, the user is allowed to change or confirm the pre-populated tax return and file it with a governmental tax agency.

The third use case also involves an existing user of an online tax application. The existing user uses real-time recognition functionality on a smartphone to send the online tax application personal and financial information from a W2 issued by an employer of the user. The online tax application uses the personal and financial information to pre-populate an online tax return in real-time or near real-time and sends the user a text message that includes language similar to the following: ""Hi Jane. We have pre-populated an online tax return with the personal and financial information from your W2. Please click here to change or confirm the online tax return." Additionally, on the basis of the personal and financial information, the online tax application assigns the user to one of a group of user classes. The assigned user class determines which interview questions are subsequently presented in dialog boxes to the user. If the user accesses the webpage using her existing credentials, the user is allowed to change or confirm the pre-populated tax return and file it with a governmental tax agency, e.g., using a GUT command from the smartphone.

Figure 5A:
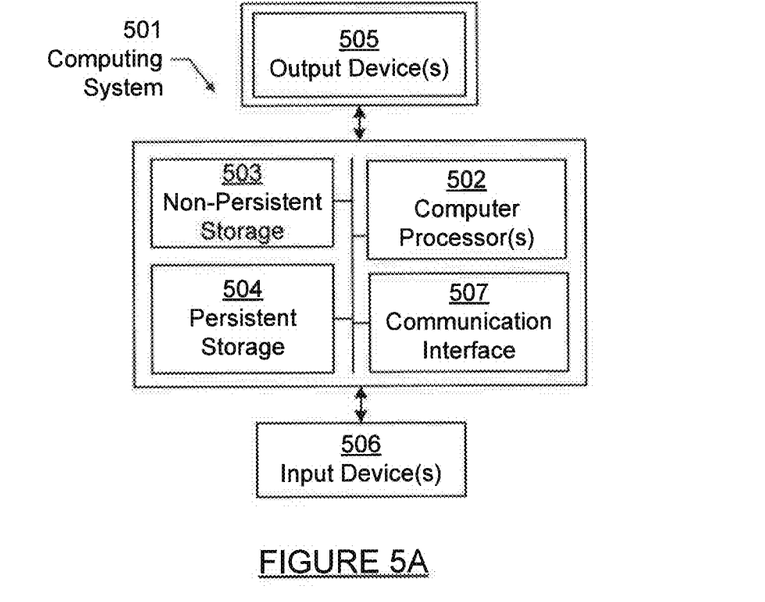
FIGS. 5A and 5B depict a computing system, in accordance with one or more embodiments of the invention.

Embodiments of the invention, including user computing device X (202) and user computing device Y (203), may be implemented on a computing system (501). Any combination of mobile, desktop, server, embedded, or other types of hardware may be used. For example, as shown in FIG. 5A, the computing system (501) may include one or more computer processor(s) (502), associated memory (503) (e.g., random access memory (RAM), cache memory, flash memory, etc.), one or more storage device(s) (504) (e.g., a hard disk, an optical drive such as a compact disk (CD) drive or digital versatile disk (DVD) drive, a flash memory stick, etc.), communication interface (507) and numerous other elements and functionalities. The computer processor(s) (502) may be an integrated circuit for processing instructions. For example, the computer processor(s) may be one or more cores, or micro-cores of a processor. The computing system (501) may also include one or more input device(s) (506), such as a touchscreen, keyboard, mouse, microphone, touchpad, electronic pen, or any other type of input device.

Further, the computing system (501) may include one or more output device(s) (505), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (501) may be connected to a network (520) (e.g., a local area network (LAN), a wide area network (WAN) such as the Internet, mobile network, or any other type of network) via a network interface connection (not shown). The input and output device(s) may be locally or remotely (e.g., via the network (520)) connected to the computer processor(s) (502), memory (503), and storage device(s) (504). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (501) may be located at a remote location and connected to the other elements over a network (520). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 5B:
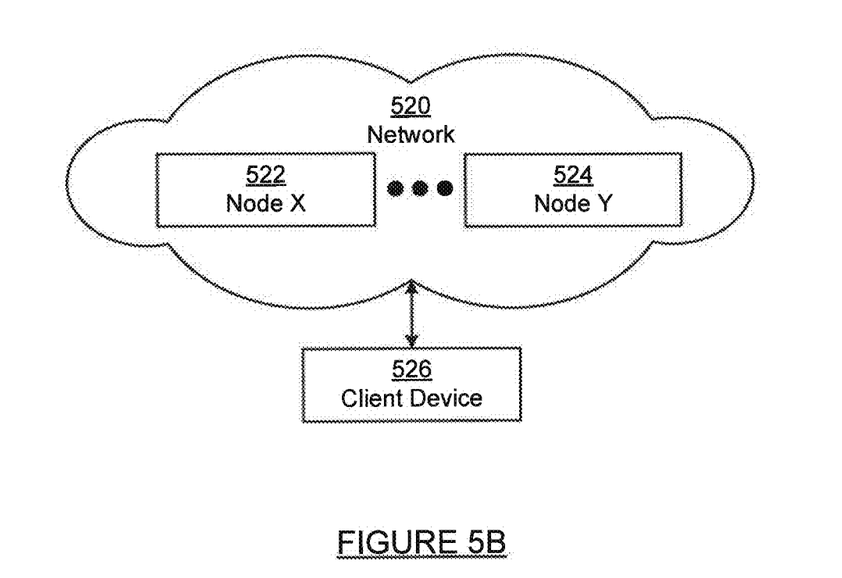

As noted above, the computing system (501) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (501) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments of the invention.

Although example embodiments of the inventions have been described in some detail for purposes of clarity of understanding, it will be apparent that certain changes and modifications can be practiced within the scope of the following claims. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising:
   receiving an email from a user device, where the email comprises an image of a third-party tax form;
   importing information from the image of a third-party tax form associated with a taxpayer;

assigning, based at least in part on the information, the
taxpayer to one of a plurality of user classes,
  where the user class of the taxpayer determines at least
    one subsequent interaction between the taxpayer and
    an online tax application, and
  where the assigning is performed by a trained binomial
    or trained multinomial classifier that uses at least one
    of logistic regression, random forest, support vector
    machines, naïve Bayes, and stochastic gradient
    descent;
pre-populating one or more fields of an online tax return
  for the taxpayer based on at least some of the information; and
sending a subsequent email to the user device with a
  notification and a link,
  where the notification indicates that the online tax
    return is pre-populated and is available for review on
    a webpage upon selection of the link, and
  where the online tax return is presented in a view in a
    graphical user interface displayed by the online tax
    application upon selection of the link;
  where each of the method steps are performed by a
    hardware processor executing software instructions
    stored in the memory.

2. The method of claim 1, further comprising operations of:
  automatically transmitting, to the taxpayer, temporary
    credentials for an account at the online tax application; and
  allowing the taxpayer to access the tax return upon
    presentation of the temporary credentials.

3. The method of claim 2, wherein the temporary credentials are randomly generated.

4. The method of claim 1, wherein the assigning is based at least in part on responses by the taxpayer to interview questions.

5. The method of claim 1, wherein the importing of information is performed using real-time text recognition.

6. The method of claim 1, wherein the importing of information is performed by software executing on a mobile device.

7. A non-transitory computer-readable media (CRM) configured to store a program, which when executed by a processor causes the processor to:
  receive an email from a user device, where the email
    comprises an image of a third-party tax form;
  import information from the image of a third-party tax
    form associated with a taxpayer;
  assign, based at least in part on the information, the
    taxpayer to one of a plurality of user classes,
    where the user class of the taxpayer determines at least
      one subsequent interaction between the taxpayer and
      an online tax application, and
    where the assigning is performed by a trained binomial
      or trained multinomial classifier that uses at least one
      of logistic regression, random forest, support vector
      machines, naïve Bayes, and stochastic gradient
      descent;
  pre-populate one or more fields of an online tax return for
    the taxpayer based on at least some of the information;
    and
  send a subsequent email to the user device with a notification and a link,
    where the notification indicates that the online tax
      return is pre-populated and is available for review on
      a webpage upon selection of the link, and
    where the online tax return is presented in a view in a
      graphical user interface displayed by the online tax
      application upon selection of the link.

8. The non-transitory CRM of claim 7, wherein the program, when executed by the processor, further:
  automatically transmits, to the taxpayer, temporary credentials for an account at the online tax application; and
  allows the taxpayer to access the tax return upon presentation of the temporary credentials.

9. The non-transitory CRM of claim 8, wherein the temporary credentials are randomly generated.

10. The non-transitory CRM of claim 7, wherein the assigning is based at least in part on responses by the taxpayer to interview questions.

11. The non-transitory CRM of claim 7, wherein the importing of information is performed using real-time text recognition.

12. The non-transitory CRM of claim 7, wherein the importing of information is performed by software executing on a mobile device.

13. A system, comprising:
  a hardware processor and memory; and
  software instructions stored in the memory, which when executed by the hardware processor, cause the hardware processor to:
    receive an email from a user device, where the email
      comprises an image of a third-party tax form;
    import information from the image of a third-party tax
      form associated with a taxpayer;
    assign, based at least in part on the information, the
      taxpayer to one of a plurality of user classes,
      where the user class of the taxpayer determines at
        least one subsequent interaction between the taxpayer and an online tax application, and
      where the assigning is performed by a trained binomial or trained multinomial classifier that uses at
        least one of logistic regression, random forest,
        support vector machines, naïve Bayes, and stochastic gradient descent;
    pre-populate one or more fields of an online tax return
      for the taxpayer based on at least some of the
      information; and
    send a subsequent email to the user device with a
      notification and a link,
      where the notification indicates that the online tax
        return is pre-populated and is available for review
        on a webpage upon selection of the link, and
      where the online tax return is presented in a view in
        a graphical user interface displayed by the online
        tax application upon selection of the link.

14. The system of claim 13, wherein the instructions, when executed by the hardware processor, further cause the hardware processor to:
  automatically transmit, to the taxpayer, temporary credentials for an account at the online tax application; and
  allow the taxpayer to access the tax return upon presentation of the temporary credentials.

15. The system of claim 14, wherein the temporary credentials are randomly generated.

16. The system of claim 13, wherein the importing of information is performed using real-time text recognition.

17. The system of claim 13, wherein the importing of information is performed by software executing on a mobile device.

* * * * *